(12) United States Patent
Varoglu et al.

(10) Patent No.: US 9,008,633 B2
(45) Date of Patent: Apr. 14, 2015

(54) METHODS TO DETERMINE AVAILABILITY OF USER BASED ON MOBILE PHONE STATUS

(75) Inventors: Devrim Varoglu, Santa Clara, CA (US); Swapnil R. Dave, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 383 days.

(21) Appl. No.: 13/399,801

(22) Filed: Feb. 17, 2012

(65) Prior Publication Data

US 2013/0217364 A1    Aug. 22, 2013

(51) Int. Cl.
| | |
|---|---|
| *H04W 4/16* | (2009.01) |
| *H04L 29/08* | (2006.01) |
| *H04M 1/2745* | (2006.01) |
| *H04M 1/56* | (2006.01) |
| *H04M 1/725* | (2006.01) |
| *H04W 4/02* | (2009.01) |

(52) U.S. Cl.
CPC ......... *H04L 67/24* (2013.01); *H04M 1/274508* (2013.01); *H04M 1/56* (2013.01); *H04M 1/72519* (2013.01); *H04M 1/72563* (2013.01); *H04W 4/02* (2013.01)

(58) Field of Classification Search
CPC .............. H04M 2207/18; H04M 1/57; H04M 1/72527; H04M 4/12
USPC ............................ 455/414.1, 415, 556.2, 466
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,671,508 B1 | 12/2003 | Mitsuoka et al. |
| 6,677,932 B1 | 1/2004 | Westerman |
| 6,888,536 B2 | 5/2005 | Westerman et al. |
| 7,139,554 B2 | 11/2006 | Litwin, Jr. |
| 7,330,721 B2 | 2/2008 | Bhatia et al. |
| 7,542,558 B2 | 6/2009 | Klein et al. |
| 2012/0032891 A1* | 2/2012 | Parivar ......................... 345/173 |
| 2012/0077479 A1* | 3/2012 | Sabotta et al. ................ 455/415 |

FOREIGN PATENT DOCUMENTS

WO    WO 01/91486 A1    11/2001

* cited by examiner

*Primary Examiner* — Phuoc H Doan
(74) *Attorney, Agent, or Firm* — Meyertons, Hood, Kivlin, Kowert & Goetzel, P.C.

(57) ABSTRACT

A command is received at an operating system of a first mobile phone for displaying contact information of a remote user having a mobile phone number of a second mobile phone. In response to the command, a request is transmitted to a remote server from the first mobile phone over a cellular network requesting an operating status of the second mobile phone. The operating status of the second mobile phone is received from the remote server over the cellular network. The operating status of the second mobile phone is displayed on a display of the first mobile phone as a part of contact information of the remote user associated with the second mobile phone, where the operating status includes current locality of the second mobile phone.

21 Claims, 10 Drawing Sheets

METHODS TO DETERMINE AVAILABILITY OF USER BASED ON MOBILE PHONE STATUS

FIELD OF THE INVENTION

Embodiments of the present invention relate generally to operating a mobile phone. More particularly, embodiments of the invention relate to techniques to determine availability of a user based on its mobile status.

BACKGROUND

Mobile devices are becoming ubiquitous. People carry them to meetings, use them out of the office, in social situations, and in other settings where wireless communication is needed. Incoming voice calls to mobile devices can be intrusive under certain situations. It is therefore desirable to allow callees to screen calls and decide in advance whether the calls warrant answering. Caller ID service is conventionally available to provide a callee with limited information about a call for call screening purposes, with the callee usually having very few options to manage the call. In particular, for most callees, the only available actions are to accept the call or decline it by either not answering or allowing an answering machine or voice mail system to respond. The caller in such cases has no control over whether or not the call will be accepted.

More advanced Caller ID services can provide the callee with limited interaction with the caller to assist the call screening process, thereby giving both the caller and the callee more control over the call. However, despite the limited interaction, the caller still has no effective way of knowing when the callee is willing to accept their call.

There are models and mechanisms such as those defined by the presence and availability management (PAM) standards that allow a caller to discover the willingness of a callee to receive a call. PAM provides a set of APIs that a caller's mobile application software can use to check for the availability of a callee. However, the PAM only provides what a user of a mobile phone provides such as online, offline, in a meeting, etc. The PAM does not specifically provide the current status or operating mode of the mobile phone.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
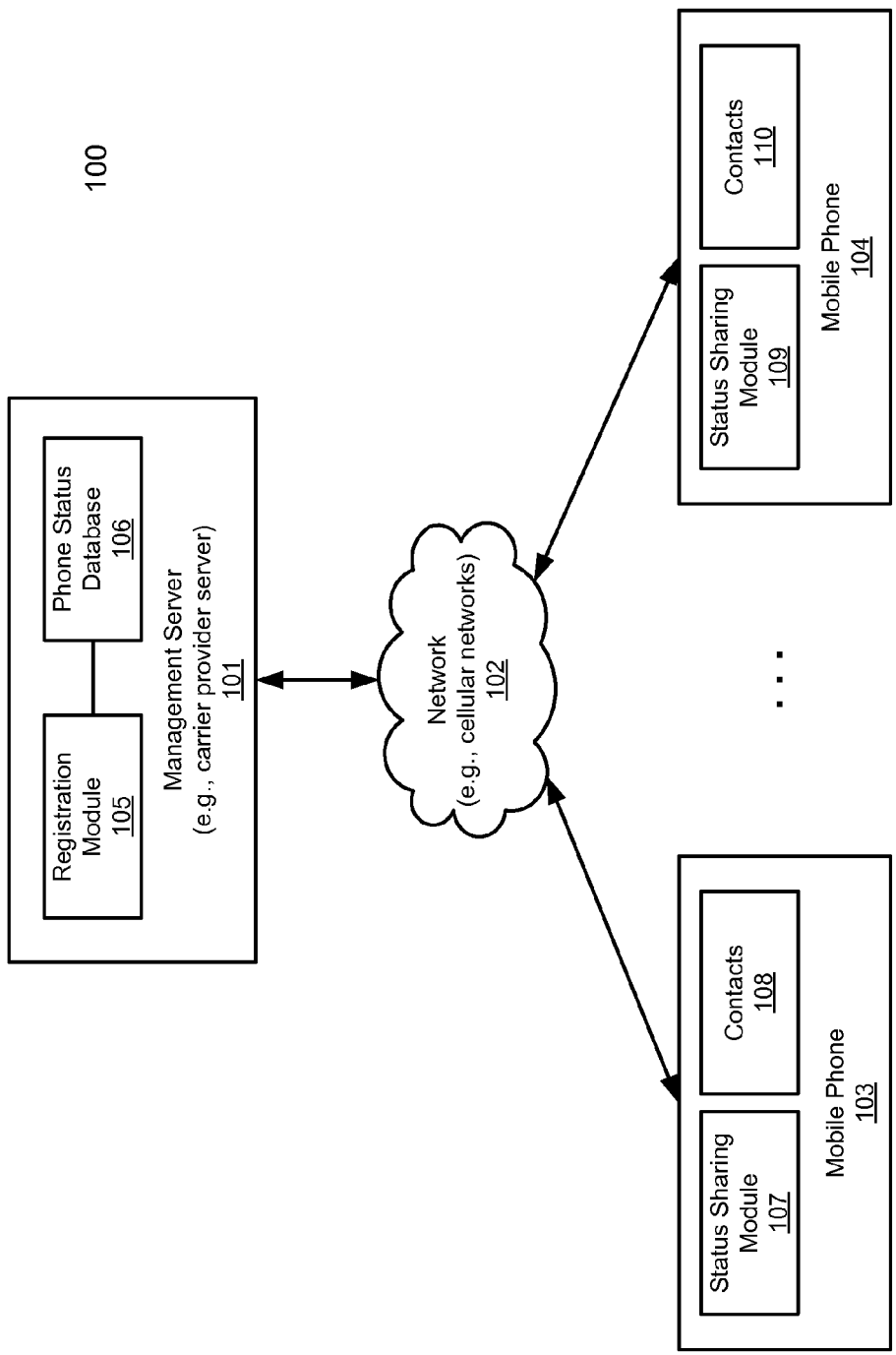
FIG. 1 is a block diagram illustrating a system configuration according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments of the invention, a mechanism is provided for users of mobile phones to share the operating status or states of their mobile phones. Instead of the conventional presence and availability typically set by the users, the mobile phones automatically share the actual operating status or states of the mobile phones (rather than the users) based on user sharing policies. According to one embodiment, when a first mobile phone is running, the first mobile phone is to automatically report the actual operating status, states, and/or conditions of the first mobile phone to a predetermined server in a cellular network. The server may be the one provided and accessible from the cellular carrier network. Examples of the reported operating statuses include at least one of the operating mode of a mobile phone (e.g., ringer, vibration, or airplane mode), current locality of the mobile phone (e.g., time zone, geographical location), cellular signal strength of the area in which the mobile phone is currently located (e.g., received signal strength indicator (RSSI)), and/or current battery condition of the mobile phone, etc. Such information may be reported from a mobile phone to the server based on user sharing preferences or policies.

When a user of a second mobile phone is to display contact information of a user of the first phone, according to one embodiment, the second mobile phone is to send a query to the server to obtain the operating status information of the first mobile phone from the server. Such information is then displayed on a display of the second mobile phone as part of the contact information of the user of the first mobile phone, within a predetermined proximity of a mobile phone number associated with the first mobile phone. As a result, instead of showing the presence and availability (which is typically set manually by a user), the actual operating status, states, or operating conditions of the mobile phone is displayed. It is up to a user of the second mobile phone to interpret and decide whether to make a call to the first mobile phone based on the operating status, states, and conditions of the first mobile phone.

FIG. 1 is a block diagram illustrating a mobile phone network according to one embodiment of the invention. Referring to FIG. 1, system 100 includes various mobile phones 103-104 communicatively coupled to each other over a cellular network(s) 102, which may be hosted by various cellular service providers or carriers (e.g., AT&T, Verizon, Sprints, T-Mobile, etc.). In one embodiment, management server 101 may be a Facetime™ server and any of mobile phones 103-104 may be an iPhone™ available Apple Inc. of Cupertino, Calif. In addition, system 100 includes a management server 101. Management server 101 may be provided by a cellular carrier. In one embodiment, management server 101 includes a registration module 105 and phone status database 106. Registration module 105 provides an interface to allow users of mobile phones to provide operating status of the mobile phones and stored in phone status database 106.

According to one embodiment, phone status database 106 can be accessed by mobile phones 103-104, for example, by contacting the corresponding cellular carrier. In one embodiment, each cellular carrier may maintain a management server similar to management server 101 to collect operating statuses of mobile phones in the carrier network. Such operating statuses may be advertised or published to the management server from the mobile phones based on user preferences of the mobile phones. In one embodiment, each mobile phone that participates in status sharing is to periodically send certain operating statuses of the mobile phone to the management server. Such operating statuses of a first mobile phone can be obtained by a second mobile phone, prior to a user of the second mobile phone making a call to the first mobile phone.

In one embodiment, each of mobile phones 103-104 includes a status sharing module (e.g., status sharing modules 107 and 109) to publish its operating statuses to management server 101 and to retrieve operating statuses of other registered mobile phones from management server 101 over cellular network. The operating statuses of a remote mobile phone can be displayed as part of contact information (e.g., contacts 108 and 110) of a user associated with the remote mobile phone. Examples of operating statuses include at least one of the operating mode of a mobile phone (e.g., ringer, vibration, or airplane mode), current locality of the mobile phone (e.g., time zone, geographical location), cellular signal strength of the area in which the mobile phone is currently located (e.g., received signal strength indicator (RSSI)), and/or current battery condition of the mobile phone, etc.

For example, according to one embodiment, it is assumed that a first user of mobile phone 104 has configured mobile phone 104 to periodically (and automatically) publish certain operating statuses of mobile phone 104 to management server 101, where management server 101 may be associated with a cellular carrier that provides cellular services to mobile phone 104. The operating statuses of mobile phone 104 are stored in phone status database 106. Subsequently, a second user of mobile phone 103 displays contact information of the first user on a display of mobile phone 103, where the contact information of the first user includes a mobile phone number of mobile phone 104. In response to the request for displaying the contact information, status sharing module 107 is to access management server 101 that is associated with a cellular carrier of mobile phone 104 to obtain the current operating statuses of mobile phone 104 at the point in time. Once mobile phone 103 opens desired contact 108 to look for mobile phone 104, a ping request may be sent to management server 102 via network 102. Details of the packet in the ping can be: [Get_Status_109_from_Database_106]. In response, management server will send a ping response to mobile phone 103 with details: [Status_106_From_mobile_104]. The OTA (Over The Air) medium may be exactly the same as used by mobile phone 103 to get cellular signals from network 102, or it may use WiFi IP address based approach to reach out management server 101.

Once the operating statuses of mobile 104 are obtained, the information is displayed as part of contact information of the first user, for example, in an address book of mobile phone 103. Such information can be utilized by the second user to interpret and decide whether it is appropriate to call the first user at the moment. As a result, unlike the conventional presence and availability (which may be manually set by the user and may not be timely updated), the operating statuses accurately represent the current operating statuses of a remote phone at the point in time.

Figure 2A:
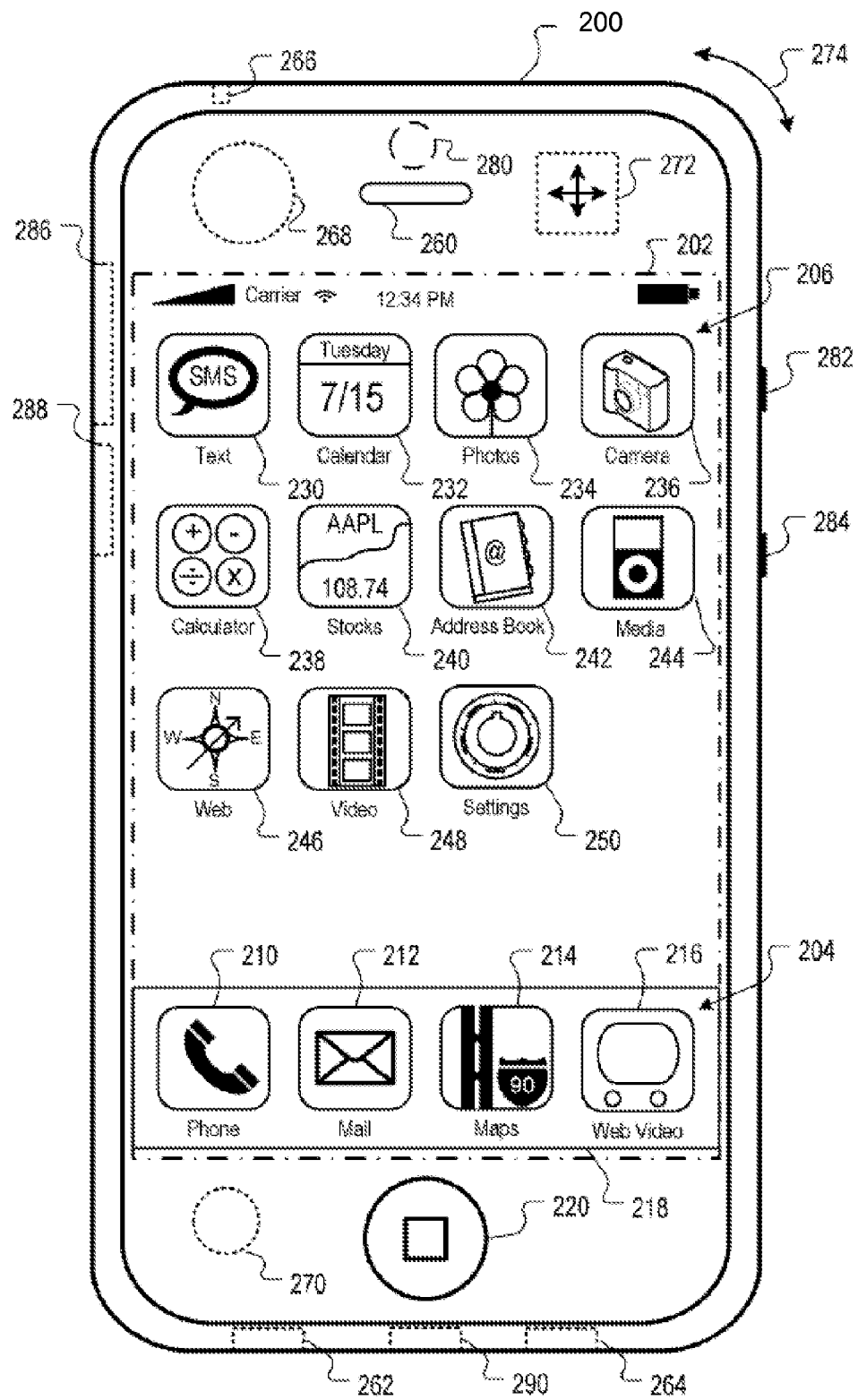
FIGS. 2A and 2B illustrate an exemplary mobile device which may be used with an embodiment of the invention.
Figure 2B:
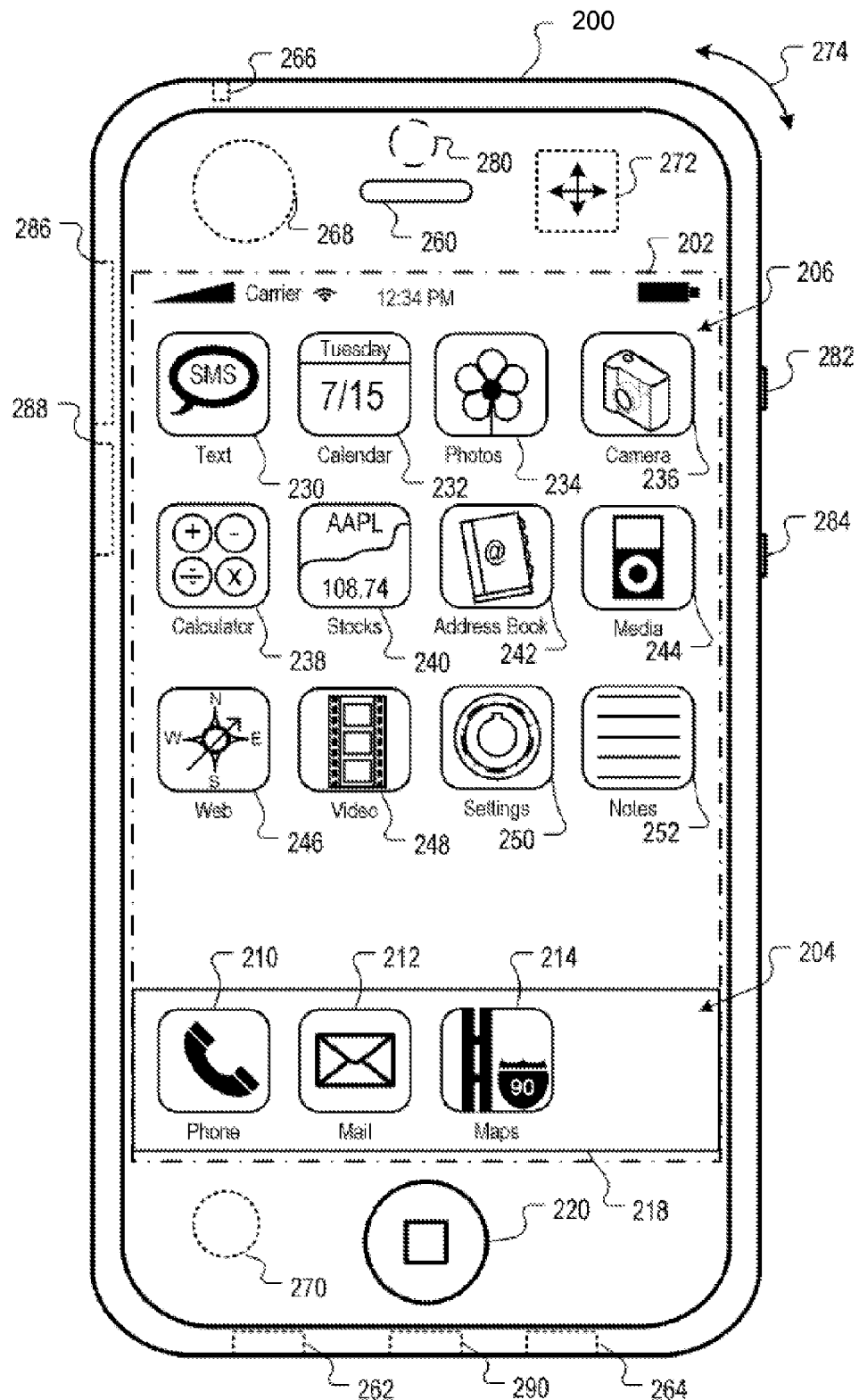

FIGS. 2A and 2B illustrate an exemplary mobile device which may be used with an embodiment of the invention. For example, mobile device 200 may represent any of mobile phones 103-104 of FIG. 1. Referring to FIGS. 2A and 2B, the mobile device 200 includes a touch-sensitive display 202. The touch-sensitive display 202 can be implemented with liquid crystal display (LCD) technology, light emitting polymer display (LPD) technology, or some other display technology. The touch sensitive display 202 can be sensitive to haptic and/or tactile contact with a user.

In some implementations, the touch-sensitive display 202 can comprise a multi-touch-sensitive display 202. A multi-touch-sensitive display 202 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 200 can display one or more graphical user interfaces on the touch-sensitive display 202 for providing the user access to various system objects and for conveying information to the user. In some implementations, the graphical user interface can include one or more display objects 204, 206. In the example shown, the display objects 204, 206, are graphic representations of system objects. Some examples of system objects include device functions, applications, windows, files, alerts, events, or other identifiable system objects.

In some implementations, the mobile device 200 can implement multiple device functionalities, such as a telephony device, as indicated by a Phone object 210; an e-mail device, as indicated by the Mail object 212; a map devices, as indicated by the Maps object 211; a Wi-Fi base station device (not shown); and a network video transmission and display device, as indicated by the Web Video object 216. In some implementations, particular display objects 204, e.g., the Phone object 210, the Mail object 212, the Maps object 214, and the Web Video object 216, can be displayed in a menu bar 218. In some implementations, device functionalities can be accessed from a top-level graphical user interface, such as the graphical user interface illustrated in FIG. 2A. Touching one of the objects 210, 212, 214, or 216 can, for example, invoke a corresponding functionality.

In some implementations, the mobile device 200 can implement network distribution functionality. For example, the functionality can enable the user to take the mobile device 200 and provide access to its associated network while traveling. In particular, the mobile device 200 can extend Internet access (e.g., Wi-Fi) to other wireless devices in the vicinity.

For example, mobile device 200 can be configured as a base station for one or more devices. As such, mobile device 200 can grant or deny network access to other wireless devices.

In some implementations, upon invocation of a device functionality, the graphical user interface of the mobile device 200 changes, or is augmented or replaced with another user interface or user interface elements, to facilitate user access to particular functions associated with the corresponding device functionality. For example, in response to a user touching the Phone object 210, the graphical user interface of the touch-sensitive display 202 may present display objects related to various phone functions; likewise, touching of the Mail object 212 may cause the graphical user interface to present display objects related to various e-mail functions; touching the Maps object 214 may cause the graphical user interface to present display objects related to various maps functions; and touching the Web Video object 216 may cause the graphical user interface to present display objects related to various web video functions.

In some implementations, the top-level graphical user interface environment or state of FIG. 2A can be restored by pressing a button 220 located near the bottom of the mobile device 200. In some implementations, each corresponding device functionality may have corresponding "home" display objects displayed on the touch-sensitive display 202, and the graphical user interface environment of FIG. 2A can be restored by pressing the "home" display object.

In some implementations, the top-level graphical user interface can include additional display objects 206, such as a short messaging service (SMS) object 230, a Calendar object 232, a Photos object 234, a Camera object 236, a Calculator object 238, a Stocks object 240, a Address Book object 242, a Media object 244, a Web object 246, a Video object 248, a Settings object 250, and a Notes object (not shown). Touching the SMS display object 230 can, for example, invoke an SMS messaging environment and supporting functionality; likewise, each selection of a display object 232, 234, 236, 238, 240, 242, 244, 246, 248, and 250 can invoke a corresponding object environment and functionality.

Additional and/or different display objects can also be displayed in the graphical user interface of FIG. 2A. For example, if the device 200 is functioning as a base station for other devices, one or more "connection" objects may appear in the graphical user interface to indicate the connection. In some implementations, the display objects 206 can be configured by a user, e.g., a user may specify which display objects 206 are displayed, and/or may download additional applications or other software that provides other functionalities and corresponding display objects.

In some implementations, the mobile device 200 can include one or more input/output (I/O) devices and/or sensor devices. For example, a speaker 260 and a microphone 262 can be included to facilitate voice-enabled functionalities, such as phone and voice mail functions. In some implementations, an up/down button 284 for volume control of the speaker 260 and the microphone 262 can be included. The mobile device 200 can also include an on/off button 282 for a ring indicator of incoming phone calls. In some implementations, a loud speaker 264 can be included to facilitate hands-free voice functionalities, such as speaker phone functions. An audio jack 266 can also be included for use of headphones and/or a microphone.

In some implementations, a proximity sensor 268 can be included to facilitate the detection of the user positioning the mobile device 200 proximate to the user's ear and, in response, to disengage the touch-sensitive display 202 to prevent accidental function invocations. In some implementations, the touch-sensitive display 202 can be turned off to conserve additional power when the mobile device 200 is proximate to the user's ear.

Other sensors can also be used. For example, in some implementations, an ambient light sensor 270 can be utilized to facilitate adjusting the brightness of the touch-sensitive display 202. In some implementations, an accelerometer 272 can be utilized to detect movement of the mobile device 200, as indicated by the directional arrow 274. Accordingly, display objects and/or media can be presented according to a detected orientation, e.g., portrait or landscape. In some implementations, the mobile device 200 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 200 or provided as a separate device that can be coupled to the mobile device 200 through an interface (e.g., port device 290) to provide access to location-based services.

In some implementations, a port device 290, e.g., a Universal Serial Bus (USB) port, or a docking port, or some other wired port connection, can be included. The port device 290 can, for example, be utilized to establish a wired connection to other computing devices, such as other communication devices 200, network access devices, a personal computer, a printer, a display screen, or other processing devices capable of receiving and/or transmitting data. In some implementations, the port device 290 allows the mobile device 200 to synchronize with a host device using one or more protocols, such as, for example, the TCP/IP, HTTP, UDP and any other known protocol.

The mobile device 200 can also include a camera lens and sensor 280. In some implementations, the camera lens and sensor 280 can be located on the back surface of the mobile device 200. The camera can capture still images and/or video.

The mobile device 200 can also include one or more wireless communication subsystems, such as an 802.11b/g communication device 286, and/or a Bluetooth™ communication device 288. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), LTE (long term evolution) Advanced, etc.

The device 200 can be configured to display a different set of display objects. In some implementations, referring to FIG. 2B, each of one or more system objects of device 200 has a set of system object attributes associated with it; and one of the attributes determines whether a display object for the system object will be rendered in the top-level graphical user interface. This attribute can be set by the system automatically, or by a user through certain programs or system functionalities as described below. FIG. 2B shows an example of how the Notes object 252 (not shown in FIG. 2A) is added to and the Web Video object 216 is removed from the top graphical user interface of device 200 (e.g. such as when the attributes of the Notes system object and the Web Video system object are modified).

Figure 3:
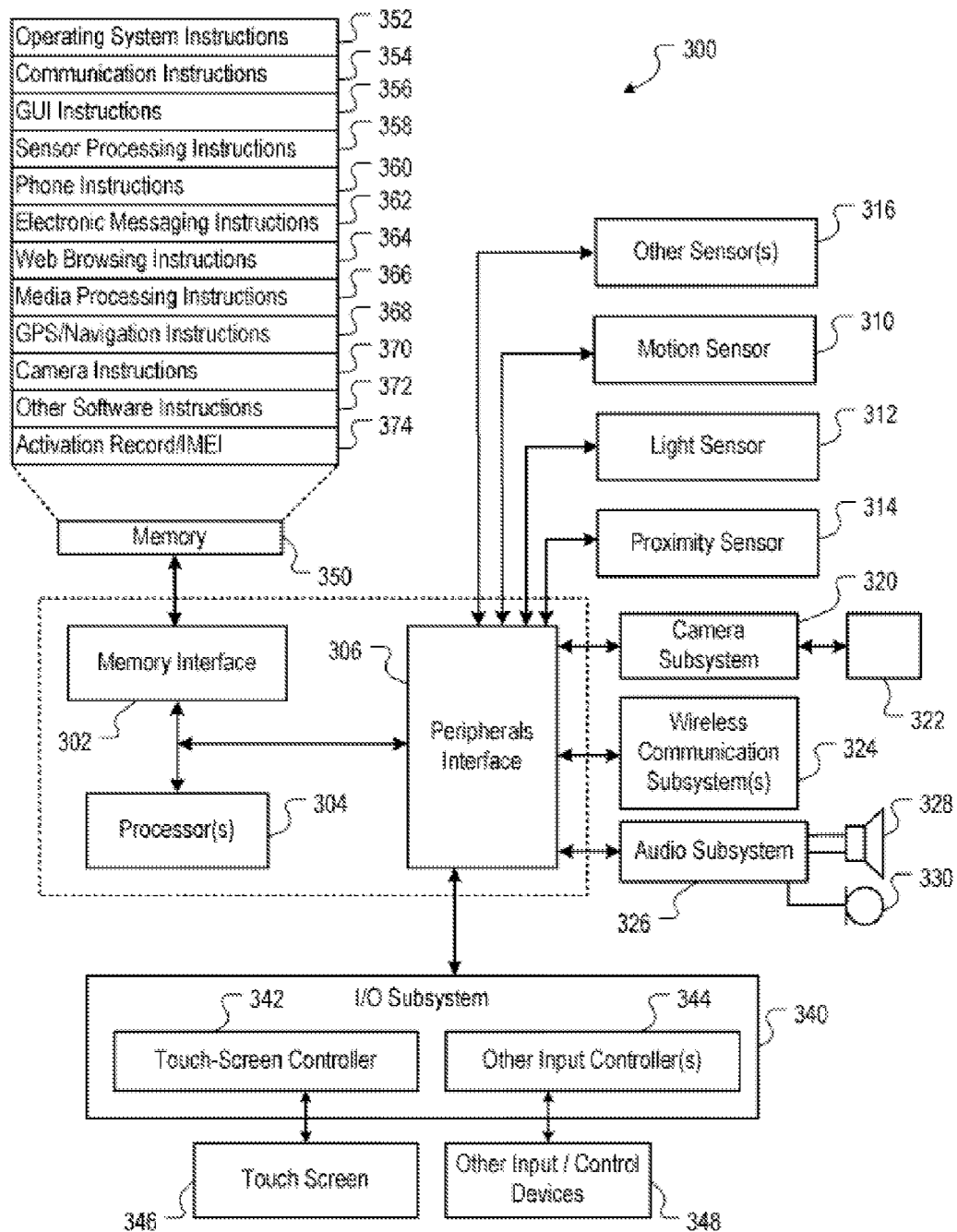
FIG. 3 is a block diagram of an example implementation of a mobile device which may be used with an embodiment of the invention.

FIG. 3 is a block diagram of an example implementation of a mobile device 200. Referring to FIG. 3, the mobile device 300 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 311 can be coupled to the peripherals interface 306 to facilitate the orientation, lighting, and proximity functions described with respect to FIG. 2A. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device is intended to operate. For example, a mobile device can include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the mobile device may be configured as a base station for other wireless devices. An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346. The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device on or off. The user may be able to customize a functionality of one or more of the buttons. The touch screen 346 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a 32-pin connector that is compatible with the iPod™. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, iOS, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., access control management functions. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device may be implemented in hardware and/or in software, including in one or more signal processing and/or application specific integrated circuits.

Figure 4:
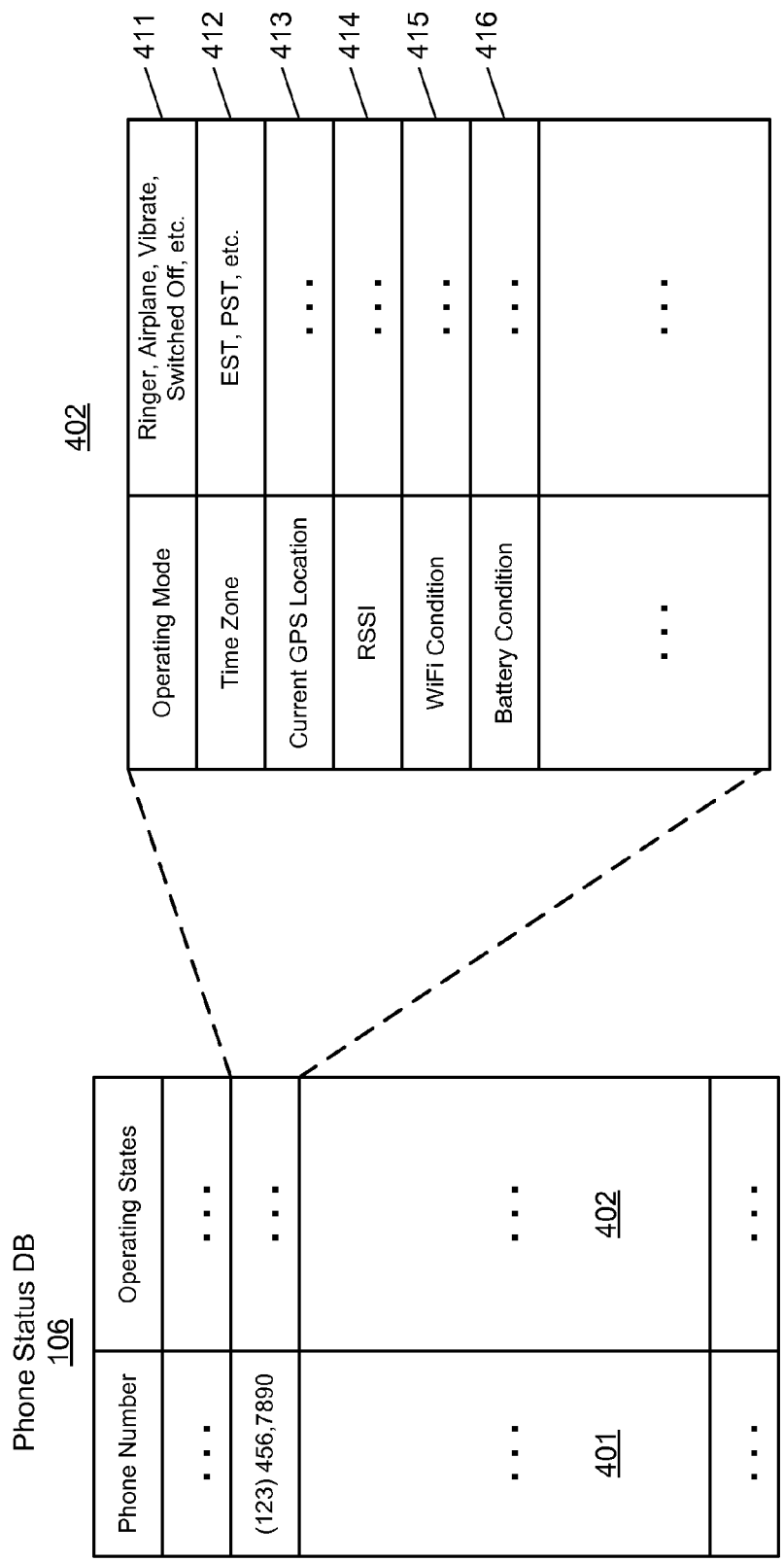
FIG. 4 is a block diagram illustrating a phone status database according to one embodiment of the invention.

FIG. 4 is a block diagram illustrating a phone status database according to one embodiment of the invention. For example, phone status database 106 may be maintained by management server 101 of FIG. 1. Referring to FIG. 4, phone status database 106 includes many entries, each being associated with a mobile phone number 401 that has been registered with the management server. Each of the registered mobile phone numbers 401 is associated with a data structure storing the operating statuses 402 of the corresponding mobile phone. Information 402 may be periodically transmitted from a corresponding mobile phone, for example, based on user sharing preferences of the mobile phone.

In one embodiment, operating status 402 includes, but is not limited to, operating mode 411, time zone 412, geographical location 413, RSSI 414, WiFi condition 415, and battery condition 416, Facetime availability, phone number does not exist anymore notification, already on another call, etc. Unlike the conventional presence and availability information, which is typically set by the user in a delay fashion, information 411-416 represents current operating statuses of a particular mobile phone at the point in time. Operating state 411 may represent a current operating state of a mobile phone, such as, whether the mobile phone is currently operating in a ringer, vibration, airplane, or switched off mode. Time zone 412 indicates a time zone the mobile phone is currently located, such as eastern or pacific time zone, or in Europe or other continents. Geographical location 413 represents a current geographical location, which may be determined by a global positioning system (GPS) unit of the mobile phone. RSSI 414 represents the current cellular signal strength received by the mobile phone. WiFi condition 415 indicates whether the mobile phone is currently connected to a WiFi hotspot. Battery condition 416 indicates the current battery condition or usage of the mobile phone.

According to one embodiment, when a first mobile phone obtains information 402 from a management server concerning the operating statuses of a second mobile phone, a user of the first mobile phone can make a proper decision based on information 402 whether to call the user of the second mobile phone. For example, if the remote mobile phone is operating in a vibration mode, a user of the local mobile phone may interpret that the user of the second mobile phone does not want to be called upon. In this example, the local user may defer calling or send an email or a text instead. Similarly, if the RSSI indicates that the remote mobile phone is in an area that does not have a good reception, the local user may decide not to call. Other scenarios may also be applied here.

Figure 5:
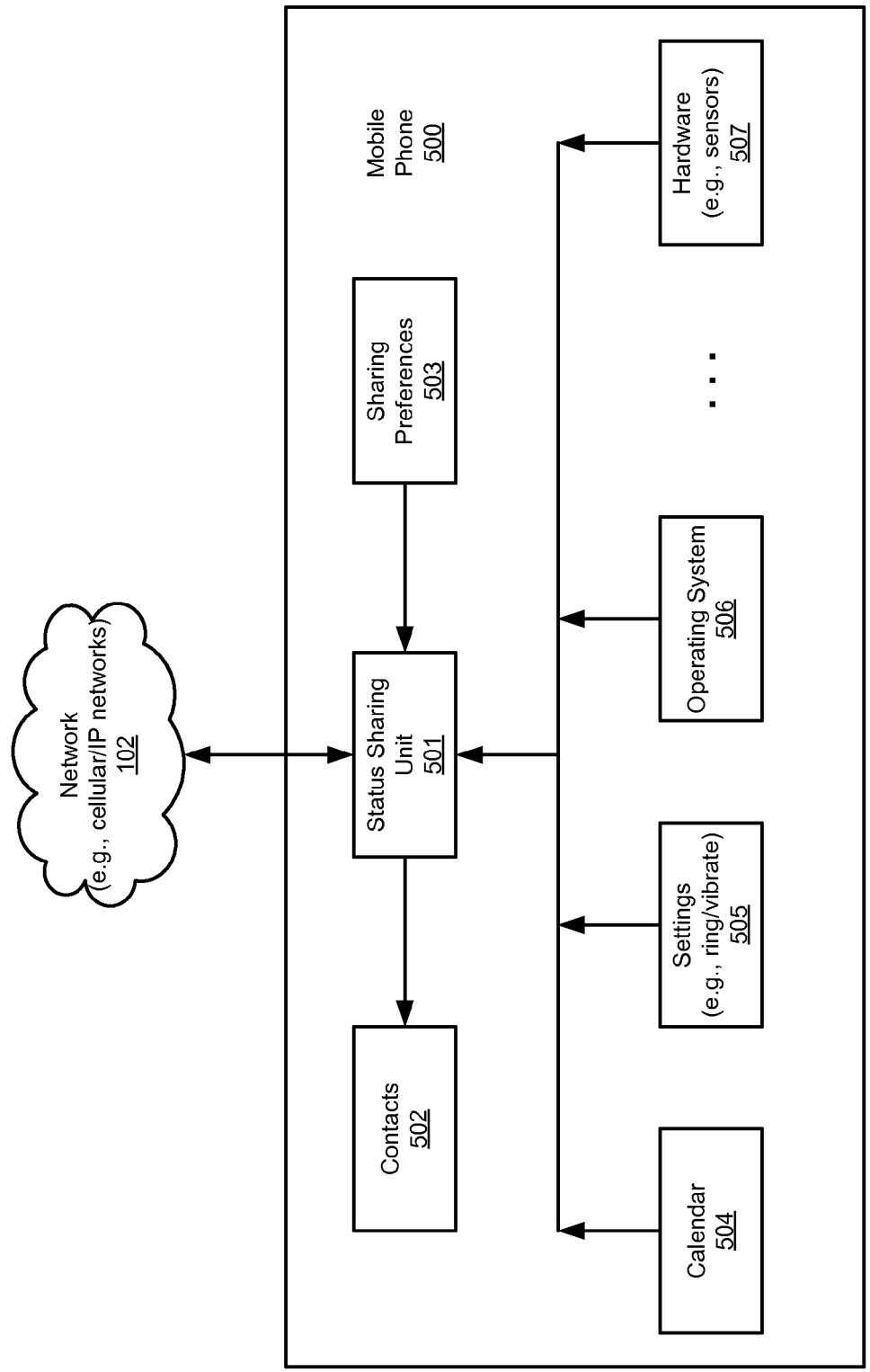
FIG. 5 is a block diagram illustrating a mobile phone according to one embodiment of the invention.

FIG. 5 is a block diagram illustrating a mobile phone according to one embodiment of the invention. Mobile phone 500 may represent any of mobile phones 103-104 of FIG. 1 or mobile phone 200 as described in FIGS. 2A-2B. Referring to FIG. 5, mobile phone 500 includes status sharing unit 501 to obtain certain operating statuses from various software and/or hardware components of mobile phone 500, including calendar 504 (e.g., meeting or events), user settings 505 (e.g., ring, vibration, airplane mode), operating system 506 (e.g., iOS), and/or hardware settings 507 (e.g., sensors, GPS transceiver, WiFi transceiver, cellular transceiver, battery monitor). According to one embodiment, status sharing unit 501 is configured to periodically publish or advertise at least some of the operating statuses to a management server (e.g., management server 101 of FIG. 1) over network 102 based on sharing preferences 503. According to one embodiment, a user of mobile phone 500 can configure sharing preferences to share which of the operating statuses to whom, etc. The user can specifically share particular information to a particular remote user (e.g., buddies or friends).

According to one embodiment, when a local user of mobile phone 500 displays contact information of a remote user having a mobile phone number as part of contacts 502 on a display of mobile phone 500, contacts 502 is to invokes status sharing unit 501 to obtain the operating statuses of a remote mobile phone associated with the mobile phone number from a management server and display at least some of the operating statuses of the remote mobile phone as part of the contact information associated with the mobile phone number in contacts 502. The local user can then decide whether to make a call to the remote user based on the information.

Figure 6:
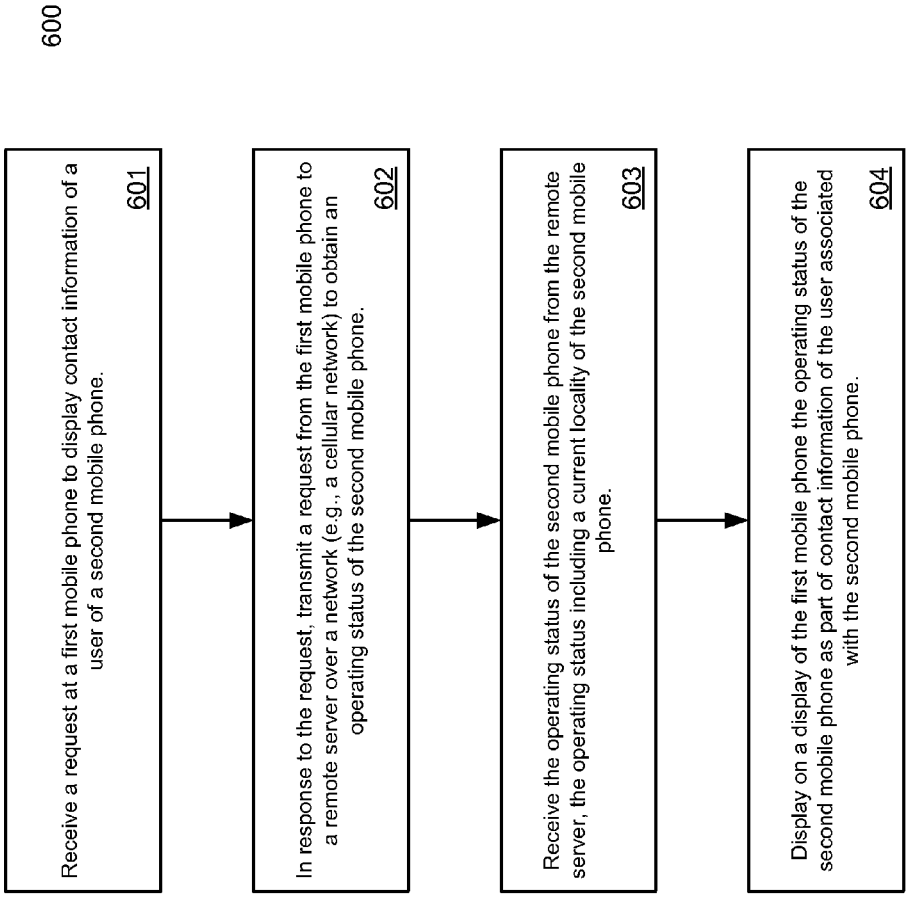
FIG. 6 is a flow diagram illustrating a method of operating a mobile phone according to one embodiment of the invention.

FIG. 6 is a flow diagram illustrating a method of operating a mobile phone according to one embodiment of the invention. Method 600 may be performed by mobile phone 500 of FIG. 5. Referring to FIG. 6, at block 601, a request is received to display on a display of a first mobile phone (e.g., local mobile phone) contact information of a user of a second mobile phone (e.g., remote mobile phone). In response to the request, at block 602, a request is transmitted from the first mobile phone to a management server over a network to obtain operating statuses of a second mobile phone. At block 603, the operating statuses of the second mobile phone are received from the management server. At block 604, the information is displayed on a display of the first mobile phone as part of contact information of the user of the second mobile phone.

Figure 7:
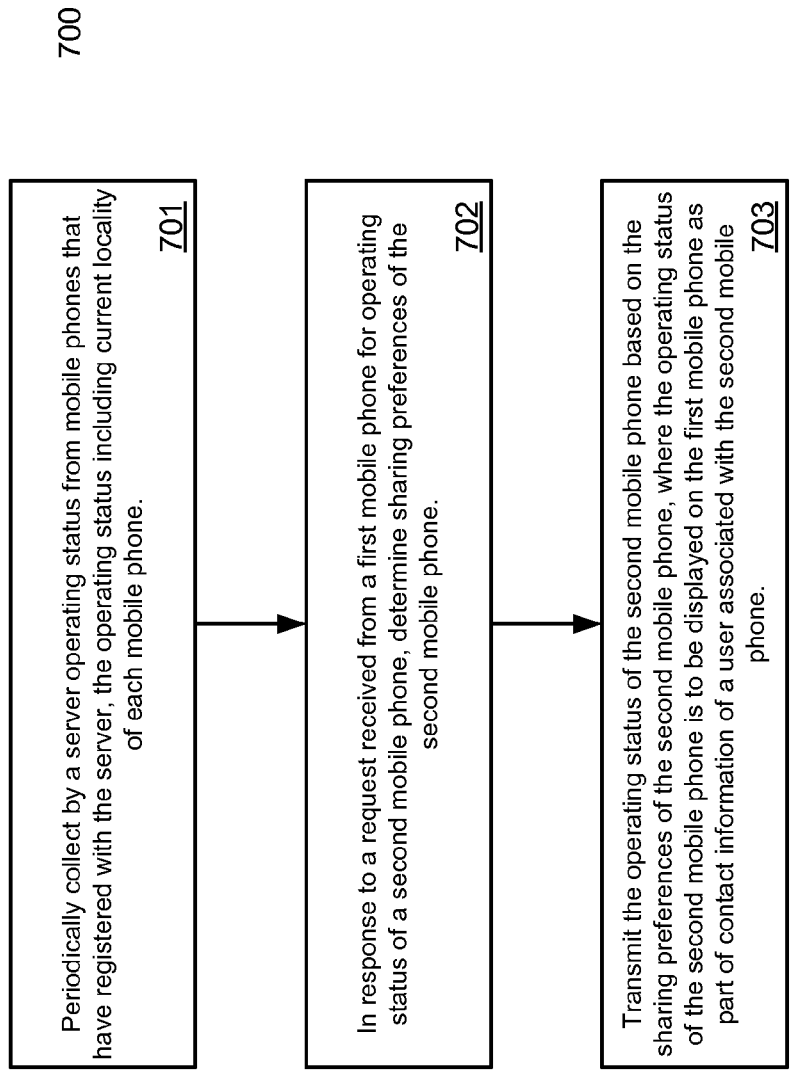
FIG. 7 is a flow diagram illustrating a method of a management server according to one embodiment of the invention.

FIG. 7 is a flow diagram illustrating a method of a management server according to one embodiment of the invention. Method 700 may be performed by management server 101 of FIG. 1. Referring to FIG. 7, at block 701, a management server periodically collects operating statuses from mobile phones that have registered with the server, where the operating statuses include at least the currently locality (e.g., time zone, GPS location) of each registered mobile phone. At block 702, in response to a request received from a first mobile phone requesting operating statuses of a second mobile phone, the server optionally determine the sharing preferences of the second mobile phone. At block 703, the operating statuses of the second mobile phone are transmitted to the first mobile phone. The operating statuses are to be displayed on the first mobile phone as part of contact information of a user associated with the second mobile phone.

Figure 8:
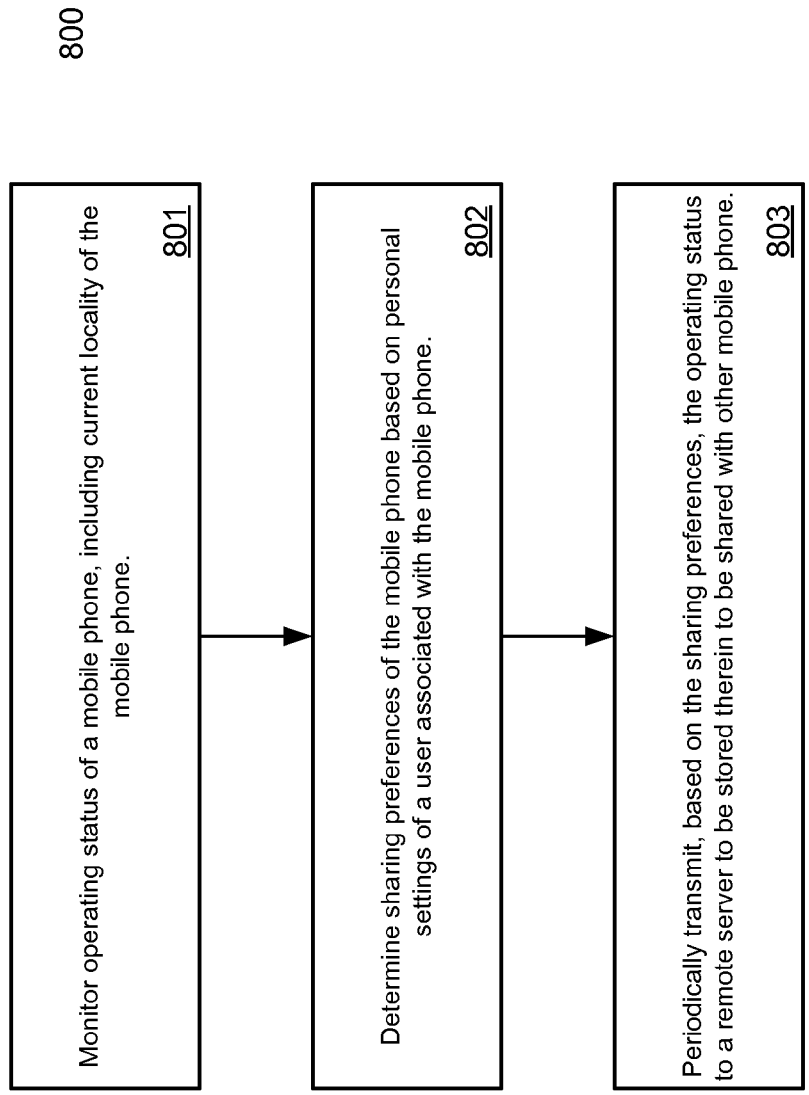
FIG. 8 is a flow diagram illustrating a method of operating a mobile phone according to one embodiment of the invention.

FIG. 8 is a flow diagram illustrating a method of operating a mobile phone according to one embodiment of the invention. Method 800 may be performed by mobile phone 500 of FIG. 5. Referring to FIG. 8, at block 801, processing logic monitors operating statuses of a mobile phone including current locality of the mobile phone. At block 802, processing logic determines the sharing preferences of the mobile phone based on personal settings of a user associated with the mobile phone. At block 803, processing logic periodically transmits, based on the sharing preferences, the operating statuses of the mobile phone to a remote server to be stored therein, such that other mobile phones can access the information.

Figure 9:
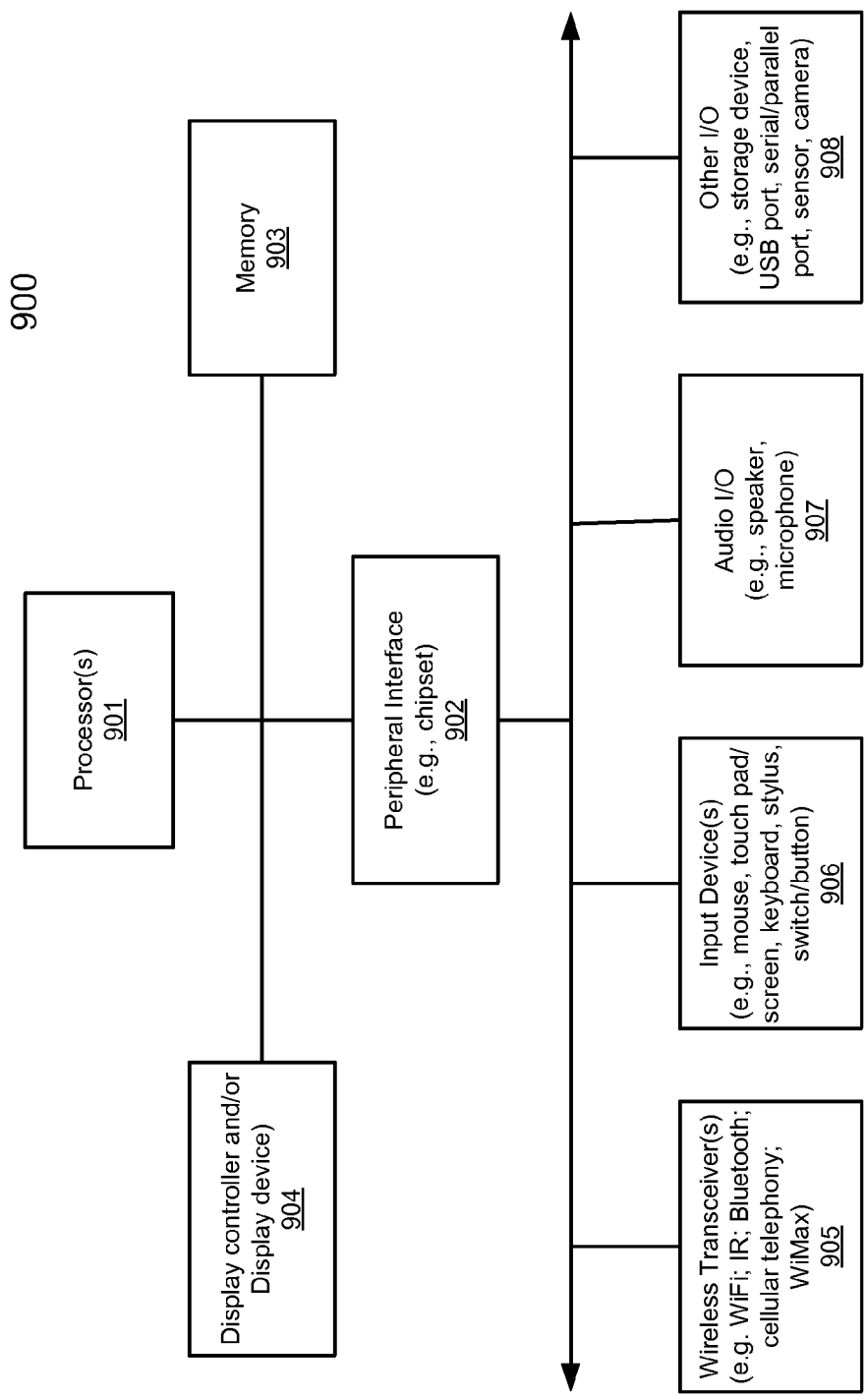
FIG. 9 is a block diagram illustrating an example of a data processing system which may be used with one embodiment of the invention.

FIG. 9 is a block diagram illustrating an example of a data processing system which may be used with one embodiment of the invention. For example, system 900 may represents any of data processing systems described above performing any of the processes or methods described above. System 900 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof.

Referring to FIG. 9, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 9 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   receiving a command at an operating system of a first mobile phone for displaying contact information of a remote user having a mobile phone number of a second mobile phone;
   in response to the command, transmitting a request to a remote server from the first mobile phone over a cellular network requesting an operating status of the second mobile phone;
   receiving the operating status of the second mobile phone from the remote server over the cellular network; and
   displaying the operating status of the second mobile phone on a display of the first mobile phone as a part of contact information of the remote user associated with the second mobile phone, the operating status including current locality of the second mobile phone.

2. The method of claim 1, further comprising:
   compiling, by a status sharing unit of the first mobile phone, information concerning operating status of the first mobile phone;
   determining sharing preferences configured by a user of the first mobile phone and stored in the first mobile phone; and
   transmitting the operating status of the first mobile phone to the remote server based on the sharing preferences.

3. The method of claim 1, wherein the operating status of the second mobile phone indicates that the second mobile phone is currently operating in one of a normal mode, an airplane mode, and a vibration mode.

4. The method of claim 1, wherein the current locality of the second mobile phone includes a current time zone in which the second mobile phone is currently located.

5. The method of claim 1, wherein the operating status of the second mobile phone includes a current global positioning system (GPS) location of the second mobile phone.

6. The method of claim 1, wherein the operating status of the second mobile phone includes a received signal strength indicator (RSSI) of the second mobile phone.

7. The method of claim 1, wherein the operating status of the second mobile phone includes a currently battery condition of the second mobile phone.

8. A non-transitory computer-readable storage medium having instructions stored therein, which when executed by a computer, cause the computer to perform a method, the method comprising:
   receiving a command at an operating system of a first mobile phone for displaying contact information of a remote user having a mobile phone number of a second mobile phone;
   in response to the command, transmitting a request to a remote server from the first mobile phone over a cellular network requesting an operating status of a second mobile phone;
   receiving the operating status of the second mobile phone from the remote server over the cellular network; and
   displaying the operating status of the second mobile phone on a display of the first mobile phone as a part of contact information of the remote user associated with the second mobile phone, the operating status including current locality of the second mobile phone.

9. The non-transitory computer-readable storage medium of claim 8, wherein the method further comprises:
   compiling, by a status sharing unit of the first mobile phone, information concerning operating status of the first mobile phone;
   determining sharing preferences configured by a user of the first mobile phone and stored in the first mobile phone; and
   transmitting the operating status of the first mobile phone to the remote server based on the sharing preferences.

10. The non-transitory computer-readable storage medium of claim 8, wherein the operating status of the second mobile phone indicates that the second mobile phone is currently operating in one of a normal mode, an airplane mode, and a vibration mode.

11. The non-transitory computer-readable storage medium of claim 8, wherein the current locality of the second mobile phone includes a current time zone in which the second mobile phone is currently located.

12. The non-transitory computer-readable storage medium of claim 8, wherein the operating status of the second mobile phone includes a current global positioning system (GPS) location of the second mobile phone.

13. The non-transitory computer-readable storage medium of claim 8, wherein the operating status of the second mobile phone includes a received signal strength indicator (RSSI) of the second mobile phone.

14. The non-transitory computer-readable storage medium of claim 8, wherein the operating status of the second mobile phone includes a currently battery condition of the second mobile phone.

15. A first mobile phone, comprising:
   a status sharing unit to receive a command at an operating system of the first mobile phone for displaying contact information of a remote user having a mobile phone number of a second mobile phone, to transmit a request to a remote server over a cellular network requesting an operating status of the second mobile phone, and to receive the operating status of the second mobile phone from the remote server over the cellular network; and
   a display unit to display the operating status of the second mobile phone on a display of the first mobile phone as a part of contact information of the remote user associated with the second mobile phone, the operating status including current locality of the second mobile phone.

16. The mobile phone of claim 15, wherein the status sharing unit is configured to:
   compile information concerning operating status of the first mobile phone;
   determine sharing preferences configured by a user of the first mobile phone and stored in the first mobile phone; and
   transmit the operating status of the first mobile phone to the remote server based on the sharing preferences.

17. The mobile phone of claim 15, wherein the operating status of the second mobile phone indicates that the second mobile phone is currently operating in one of a normal mode, an airplane mode, and a vibration mode.

18. The mobile phone of claim 15, wherein the current locality of the second mobile phone includes a current time zone in which the second mobile phone is currently located.

19. The mobile phone of claim 15, wherein the operating status of the second mobile phone includes a current global positioning system (GPS) location of the second mobile phone.

20. The mobile phone of claim 15, wherein the operating status of the second mobile phone includes a received signal strength indicator (RSSI) of the second mobile phone.

21. The mobile phone of claim 15, wherein the operating status of the second mobile phone includes a currently battery condition of the second mobile phone.

\* \* \* \* \*